(12) United States Patent
Haggblom et al.

(10) Patent No.: US 7,867,750 B2
(45) Date of Patent: Jan. 11, 2011

(54) METHOD FOR ANAEROBIC DEGRADATION OF FUEL OXYGENATES AND SIMILAR COMPOUNDS

(75) Inventors: Max M. Haggblom, New York, NY (US); Piyapawn Somsamak, Nan (TH)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 843 days.

(21) Appl. No.: 11/781,014

(22) Filed: Jul. 20, 2007

(65) Prior Publication Data

US 2008/0020447 A1 Jan. 24, 2008

Related U.S. Application Data

(60) Provisional application No. 60/832,236, filed on Jul. 20, 2006.

(51) Int. Cl.
*A61D 3/00* (2006.01)
(52) U.S. Cl. .................. 435/262.5; 435/262; 435/243
(58) Field of Classification Search .............. 435/262.5, 435/262, 243
See application file for complete search history.

(56) References Cited

U.S. PATENT DOCUMENTS 5,998,198 A * 12/1999 Nakayama et al. ....... 435/262.5

OTHER PUBLICATIONS

Haggblom et al. Appl. Microbiol. Biotechnol. (1986) 24: 397-404.*
Youngster et al. Appl. Microbiol. Biotechnol. (2008) 80: 1113-1120.*
Fayolle et al. Appl. Microbiol. Biotechnol. (2001) 56: 339-349.*
Kharoune et al. Environ. Toxicol. Chem. (2002) 21(10): 2052-2058.*
Somsamak et al. Environ. Sci. Technol. (2005) 39: 103-109.*

* cited by examiner

*Primary Examiner*—Sandra Saucier
*Assistant Examiner*—Susan Hanley
(74) *Attorney, Agent, or Firm*—Fox Rothschild LLP (57) ABSTRACT

The present invention relates to a method for remediating fuel oxygenate-contaminated soil, sediment or groundwater comprising combining at least one natural microorganism source with at least one methoxylated phenolic compound under anaerobic conditions. The invention also relates to a method for increasing the rate of remediation of fuel oxygenate-contaminated soil.

20 Claims, 10 Drawing Sheets

Fig. 1 syringate vanillate guaiacol gallate protocatechuate catechol

METHOD FOR ANAEROBIC DEGRADATION OF FUEL OXYGENATES AND SIMILAR COMPOUNDS

CROSS-REFERENCE TO RELATED APPLICATIONS

This application claims the benefit of priority of U.S. Provisional Application No. 60/832,236, filed Jul. 20, 2006, the contents of which are herein incorporated by reference.

FIELD OF THE INVENTION

The present invention relates to a method for remediating fuel oxygenate-contaminated soil, sediment or groundwater comprising combining at least one natural microorganism source with at least one methoxylated phenolic compound under anaerobic conditions. Generally, the methoxylated phenolic compound is derived from a plant.

BACKGROUND OF THE INVENTION

Methyl tert-butyl ether (MTBE) is a synthetic compound produced almost exclusively for use in gasoline as an octane enhancer and lately as a fuel oxygenate to reduce atmospheric concentrations of carbon monoxide and ozone in accordance with the United States Clean Air Act Amendments of 1990. Several other chemicals have also been used as fuel oxygenates, including ethyl tert-butyl ether (ETBE), tert-amyl methyl ether (TAME), diisopropyl ether (DIPE), tert-butyl alcohol (TBA), methanol, and ethanol (Johnson, R.; Pankow, J.; Bender, D.; Price, C.; Zogorski, J. MTBE, To what extent will past releases contaminate community water supply wells? *Environ. Sci. Technol.* 2000, 34, 210A-217A). Because of its low cost, ease of production, and favorable transfer and blending characteristics, MTBE is the most commonly used fuel oxygenate (Ainsworth, S. Oxygenates seen as hot market by industry. *Chem. Eng.* 1992, 70, 26-30; Shelly, S.; Fouhy, K. The drive of cleaner burning fuel. *Chem. Eng.* 1994, 101, 61-63; and Squillace, P. J.; Pankow, J.; Korte, N. E.; Zogorski, J. S. *Environmental Behavior and Fate of Methyl tert-Butyl Ether (MTBE)*, U.S. Geological Survey, FS-203-98, 1998). MTBE is currently the focus of public concern, particularly in the United States, as MTBE has been detected in groundwater and surface water across the U.S. (Squillace, P. J.; Zogorski, J. S.; Wilber, W. G.; Price, C. V. Preliminary assessment of the occurence and possible sources of MTBE in groundwater in the United States, 1993-1994. *Environ. Sci. Technol.* 1996, 30, 1721-1730 and Reuter, J. E.; Allen, B. C.; Richards, R. C.; Pankow, J. F.; Goldman, C. R.; Scholl, R. L.; Seyfried, J. S. Concentrations, sources, and fate of the gasoline oxygenate methyl tert-butyl ether (MTBE) in the multiple-use lake. *Environ. Sci. Technol.* 1998, 32, 3666-3672). MTBE has a very low taste and odor threshold, and thus even small quantities of MTBE will affect the quality of drinking water. There is also concern about its possible risk to human health, which is still inconclusive.

Generally, contaminants can be naturally attenuated by various processes, including volatilization, adsorption, dispersion, hydrolysis, and biodegradation. Unlike other gasoline components, such as BTEX compounds (benzene, toluene, ethylbenzene, o-, m-, p-xylene), MTBE is very water-soluble and it tends to partition from gasoline to the water phase. Once dissolved in water, the relatively low Henry's law constant of MTBE does not lead to significant losses by partitioning in to the gas phase. The relatively low $K_{oc}$ of MTBE implies that its movement is minimally retarded by soil particles, thus allowing MTBE plumes to travel at almost the same velocity as the groundwater stream. The reduction of MTBE mass by physical processes in groundwater is probably insignificant, because volatilization in aquifers is not very efficient and the hydrolysis of MTBE at almost neutral pH values is very slow (O'Reilly, K. T.; Moir, M. E.; Taylor, C. D.; Smith, C. A.; Hyman, M. R. Hydrolysis of tert-butyl methyl ether (MTBE) in dilute aqueous acid. *Environ. Sci. Technol.* 2001, 35, 3954-3961). Therefore, bioremediation may play a significant role in mass reduction of MTBE at contaminated sites.

Although early reports indicated that MTBE is resistant to biodegradation, aerobic MTBE biodegradation has been clearly demonstrated (Deeb, R. A.; Scow, K. M.; Alvarez-Cohen, L. Aerobic MTBE degradation: an examination of past studies, current challenges and future research directions. *Biodegradation* 2000, 11, 171-186; Fayolle, F.; Vandecasteele, J. P.; Monot, F. Microbial degradation and fate of methyl tert-butyl ether and related fuel oxygenates. *Appl. Microbiol. Biotechnol.* 2001, 56, 339-349; and Stocking, A. J.; Deeb, R. A.; Flores, A. E.; Stringfellow, W.; Talley, J.; Brownnell, R.; Kavanaugh, M. C. Bioremediation of MTBE: a review from a practical perspective. *Biodegradation* 2000, 11, 187-201) along with the biodegradation of other structurally related fuel oxygenates such as TAME, ETBE, and TBA. Recently, MTBE has also been shown to be biodegradable anaerobically under methanogenic (Mormile, M. R.; Liu, S.; Suflita, J. M. Anaerobic biodegradation of gasoline oxygenates: extrapolation of information to multiple sites and redox conditions. *Environ. Sci. Technol.* 1994, 28, 1727-1732 and Wilson, J. T.; Soo Cho, J.; Wilson, B. H.; Vardy, J. A. *Natural Attenuation of MTBE in the subsurface under methanogenic conditions*, U.S. Environmental Protection Agency, Office of research and Development: Washington, D.C., 2000), denitrifying (Bradley, P. M.; Chapelle, F. H., Landmeyer, J. E. Methyl t-butyl ether mineralization in surface water sediment microcosms under denitrifying conditions. *Appl. Environ. Microbiol.* 2001, 67, 1975-1978), iron (III) reducing (Finneran, K. T.; Lovley, D. R. Anaerobic degradation of methyl tert-butyl ether (MTBE) and tert-butyl alcohol (TBA). *Environ. Sci. Technol.* 2001, 35, 1785-1790), and sulfate-reducing (Somsamak, P.; Cowan, R. M.; Häggblom, M. M. Anaerobic biotransformation of fuel oxygenates under sulfate-reducing conditions. *FEMS Microbiol Ecol.* 2001, 37, 259-264) conditions. tert-Butyl alcohol (TBA) is often detected as intermediate of MTBE biodegradation, suggesting that cleavage of the ether bond is the initial step in the degradation pathway. Under both aerobic and anaerobic conditions, the slow degradation of TBA indicated by an enrichment of these components suggests that the degradation of the metabolite is a crucial step in MTBE mineralization.

Anaerobic MTBE degradation is extremely important for natural attenuation as a remediation option, since MTBE contaminated sites are often subsurface with limited oxygen available for biodegradation. Moreover, co-contamination with a mixture of gasoline hydrocarbons leads to a rapid consumption of oxygen in aquifers. Under anaerobic conditions, MTBE degradation is relatively rare.

The present invention relates to the discovery of the ability of MTBE-utilizing cultures to metabolize O-methyl substituents of plant phenolic compounds and to the effect of these compounds on anaerobic MTBE degradation.

SUMMARY OF THE INVENTION

The present invention relates to a method for remediating fuel oxygenate-contaminated soil, sediment or groundwater comprising combining at least one natural microorganism source with at least one methoxylated phenolic compound under anaerobic conditions for a period of time sufficient to convert at least a portion of the fuel oxygenate into an anaerobic bioremediation product.

In one embodiment the fuel oxygenate is selected from the group consisting of methyl tert-butyl ether (MTBE), tert amyl methyl ether (TAME), diisopropyl ether (DIPE), ethyl tert-butyl ether (ETBE), tert-butyl alcohol (TBA), and isopropyl ether In one embodiment the methoxylated phenolic compound is a plant-derived methoxylated phenolic compound. In another embodiment the plant-derived methoxylated phenolic compound is selected from the group consisting of syringate, vanillate, and guaiacol. In yet another embodiment the plant methoxylated phenolic compound is added at a concentration of about 0.750 mM or less, about 0.500 mM or less, about 0.100 mM or less, or about 0.050 mM or less.

In one embodiment the anaerobic bioremediation mixture is maintained in a vessel. In another embodiment the natural microorganism is present in the fuel oxygenate-contaminated soil.

In another aspect the invention relates to a method for increasing the rate of remediation of fuel oxygenate-contaminated soil comprising maintaining an anaerobic bioremediation mixture comprising fuel oxygenate-contaminated soil, at least one natural microorganism source, and at least one methoxylated phenolic compound under anaerobic conditions for a period of time sufficient to convert at least about 50% of the fuel oxygenate into an anaerobic bioremediation product, wherein the period of time is less than a period of time necessary to convert at least about 50% of the fuel oxygenate into an anaerobic bioremediation product in the absence of the methoxylated phenolic compound.

BRIEF DESCRIPTION OF THE DRAWINGS

FIG. 4. (a) Anaerobic biodegradation of MTBE in the presence of methoxylated plant phenolic compounds. Error bars represent standard deviation of triplicate cultures. (b) Repeated spiking with MTBE+ an O-methyl aryl ether (syringate, guaiacol, or vanillate) led to an increased rate of degradation.

DETAILED DESCRIPTION OF THE INVENTION

The present invention relates to a method for remediating fuel oxygenate-contaminated soil, sediment or groundwater comprising combining at least one natural microorganism source with at least one methoxylated phenolic compound under anaerobic conditions for a period of time sufficient to convert at least a portion of the fuel oxygenate into an anaerobic bioremediation product. "Remediation" refers to the biodegradation of the fuel oxygenate. The biodegradation is carried out by one natural microorganism source, the "biodegrader", under anaerobic conditions. Biodegraders suitable for use in the present invention are bacteria capable of biodegradation of a fuel oxygenate or a plurality of fuel oxygenates under anaerobic conditions. Biodegraders include, but are not limited to mixed bacterial cultures, isolated mixed bacterial cultures, pure (single cell) bacterial cultures, derivatives of mixed or pure bacterial cultures, and the like. The biodegrader is preferably a natural microorganism found at the site (soil, sediment or groundwater) to be remediated.

Fuel oxygenates are oxygen-containing hydrocarbons which include, for example, but are not limited to, ethers, alkyl ethers and alkyl alcohols, particularly branched alkyl ethers/alcohols, and more particularly tertiary carbon atom-containing alkyl ethers/alcohols. In a preferred embodiment the fuel oxygenate is selected from the group consisting of methyl tert-butyl ether (MTBE), tert amyl methyl ether (TAME), diisopropyl ether (DIPE), ethyl tert-butyl ether (ETBE), tert-butyl alcohol (TBA), and isopropyl ether.

The methoxylated phenolic compound is preferably a plant-derived methoxylated phenolic compound. Methoxylated plant-derived phenolic compounds at the appropriate concentration stimulate anaerobic degradation of MTBE. "Plant-derived" means the methoxylated phenolic compound can be isolated from a plant. While a plant is one possible source for the methoxylated phenolic compound, the methoxylated phenolic compound can also be isolated from other organisms or chemically synthesized.

In one embodiment the plant-derived methoxylated phenolic compound is selected from the group consisting of syringate, vanillate, and guaiacol. The terms "syringate", "vanillate", and "guaiacol" include the acid and salt forms of these compounds. In another embodiment the plant methoxylated phenolic compound is added to a concentration of about 0.750 mM or less, about 0.500 mM or less, about 0.100 mM or less, or about 0.050 mM or less.

An anaerobic bioremediation product is a chemical compound produced upon degradation of the fuel oxygenate. Examples include TBA, tert-butyl formate (TBF), and methyl acetate.

Microorganisms which degrade fuel oxygenates under aerobic conditions may be utilized in bioremediation schemes to remove fuel oxygenates from contaminated environments, such as air, soil or water. Various bioremediation schemes may be employed, such as air biofilters for removing fuel oxygenates from air, and activated sludge, rotating biological contactors, trickling filters and biofilm reactors for removing fuel oxygenates from water or other aqueous media. Fuel oxygenate-degrading microorganisms may also be directly injected into the ground for decontamination of fuel oxygenate-containing soils.

By way of example only, fuel oxygenates may be removed from a contaminated air supply (for example, vapors escaping from a gasoline storage tank, or MTBE removed by soil vapor extracted from contaminated soil) using an air biofilter. The biofilter is packed with material to provide a support surface for the selected microorganism. Such material may be, for example, moss, peat, clay, gravel or plastic. The microorganism is provided on the support surface, and air containing the fuel oxygenate is forced through the biofilter. Water is circulated through the column to provide moisture, nitrogen and phosphorous to support microbial growth.

In another aspect the invention relates to a method for increasing the rate of remediation of fuel oxygenate-contaminated soil comprising maintaining an anaerobic bioremediation mixture comprising fuel oxygenate-contaminated soil, at least one natural microorganism source, and at least one methoxylated phenolic compound under anaerobic conditions for a period of time sufficient to convert an amount of the fuel oxygenate into an anaerobic bioremediation product, wherein the period of time is less than a period of time necessary to convert the same amount of the fuel oxygenate into an anaerobic bioremediation product in the absence of the methoxylated phenolic compound. In certain embodiments, the period of time is sufficient to convert at least about 5%, 10%, 15%, 20%, 25%, 30%, 35%, 40%, 45%, or 50% of the fuel oxygenate into an anaerobic bioremediation product. In a preferred embodiment, the period of time is sufficient to convert at least about 50% of the fuel oxygenate into an anaerobic bioremediation product.

It is to be understood that the examples are for illustrative purposes only, and should not be interpreted as restricting the spirit and scope of the invention, as defined by the scope of the claims that follow. All references identified herein, including U.S. patents, are hereby expressly incorporated by reference.

EXAMPLES

1. Assays

The MTBE-utilizing culture is enriched from methanogenic MTBE-utilizing microcosms. The active microcosms are fed with MTBE to enrich the microorganisms capable of utilizing MTBE as the sole carbon and energy source. The enrichment is repeatedly transferred until a sediment-free culture is obtained. The MTBE-grown culture is centrifuged, supernatant liquid is discarded and replenished with fresh methanogenic medium. Cultures are set up in triplicate for each substrate, and media control (no culture added). Syringic acid, vanillic acid, or guaiacol is added to a concentration of 800-1000 mM in biodegradation study, and 80 mM to study its effect on MTBE degradation.

Figure 1:
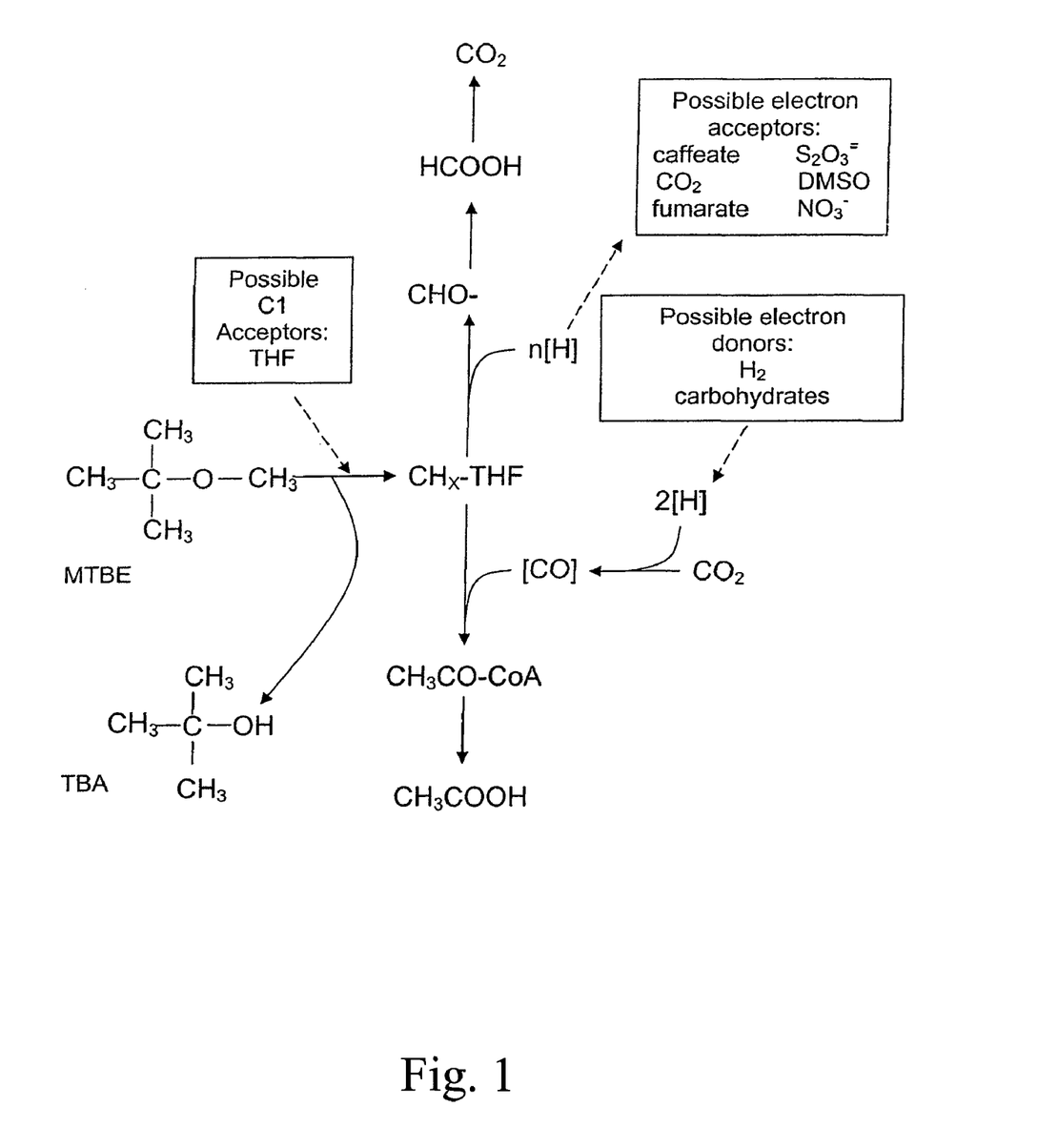
FIG. 1. Carbon flow for proposed pathway of ether cleavage of MTBE and metabolism of methyl group. "THF" is tetrahydrofolate. DMSO is dimethyl sulfoxide (acetogenic pathway adapted from Frazer 1994).
Figure 2:
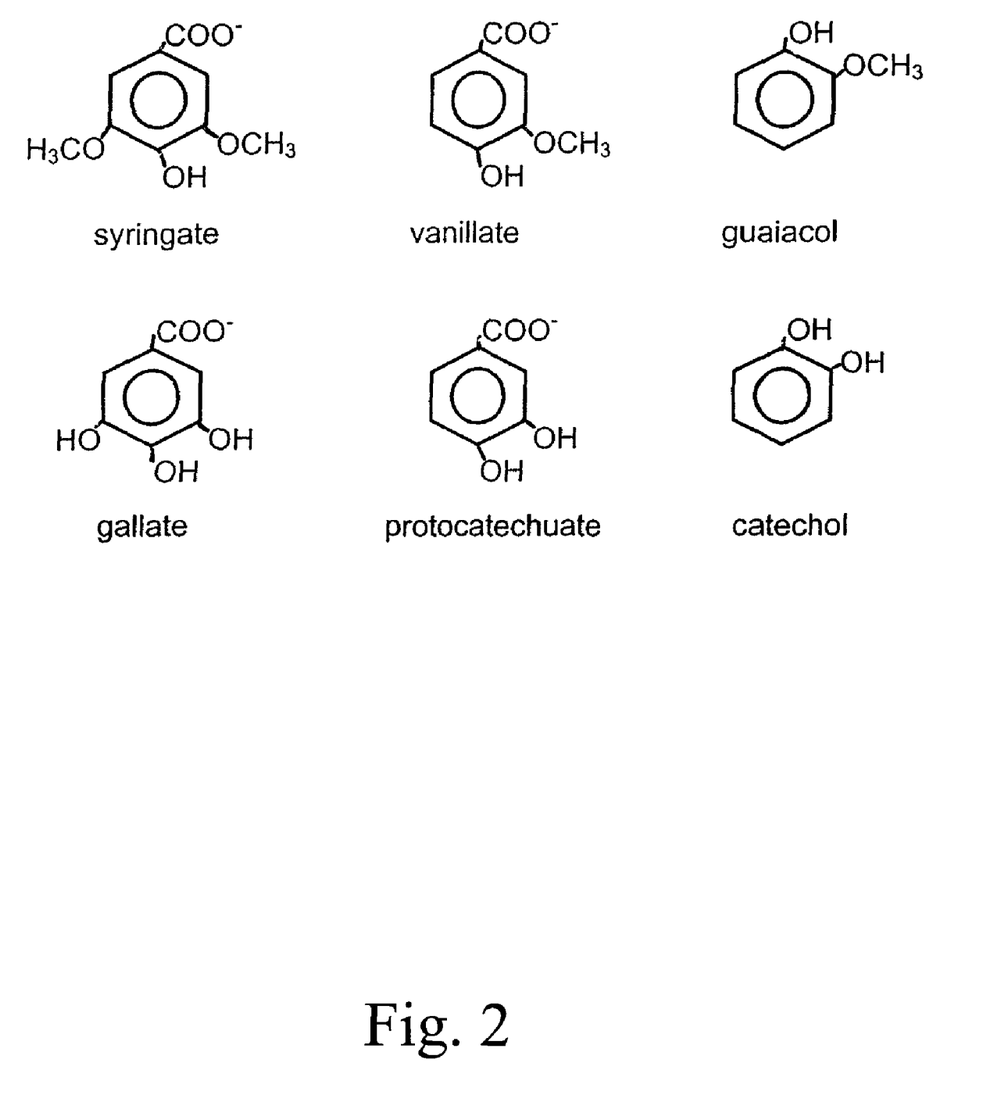
FIG. 2. Molecular structure of plant phenolic compounds and their metabolites in this study.

The plant-derived phenolic compounds syringic acid, vanillic acid and guaiacol, (FIG. 2) and MTBE (HPLC grade) are obtained from Aldrich Chemical Co. (Milwaukee, Wis.). Protocatechulic acid and catechol are purchased from Sigma Chemical Co. (St Louis. MO).

MTBE concentrations are determined by a static headspace method. A 100 µL headspace sample is analyzed for substrates with a Hewlett-Packard 5890 gas chromatograph equipped with a 0.53 mm×30 m DB1 column (J&W Scientific, Folsom, Calif.) and a flame ionization detector with Helium as carrier gas. The GC column temperature is first held at 35° C. for 3 min, increased to 120° C. at a rate of 5° C./min, and then held for 1 min. The detection limit of MTBE concentration is 0.5 mg/L.

Liquid samples are withdrawn with sterile syringe previously flushed with argon or nitrogen to remove oxygen. The samples are centrifuged and filtered to remove suspended solids. Syringate, vanillate, and guaiacol are measured by high-performance liquid chromatography using a Sphere-Clone 51.1 ODS(1) .(250×4.6 mm) column (Phenomenex, Torrance, Calif.). The mobile phase is 30% methanol/68% water/2% acetic acid at a flow rate of 1.0 ml/min. Eluted peaks are detected by absorbance at a wavelength of 280 nm. Intermediates are identified by co-elution with authentic standards. The detection limits of aromatic compounds are 10 µM.

Figure 3:
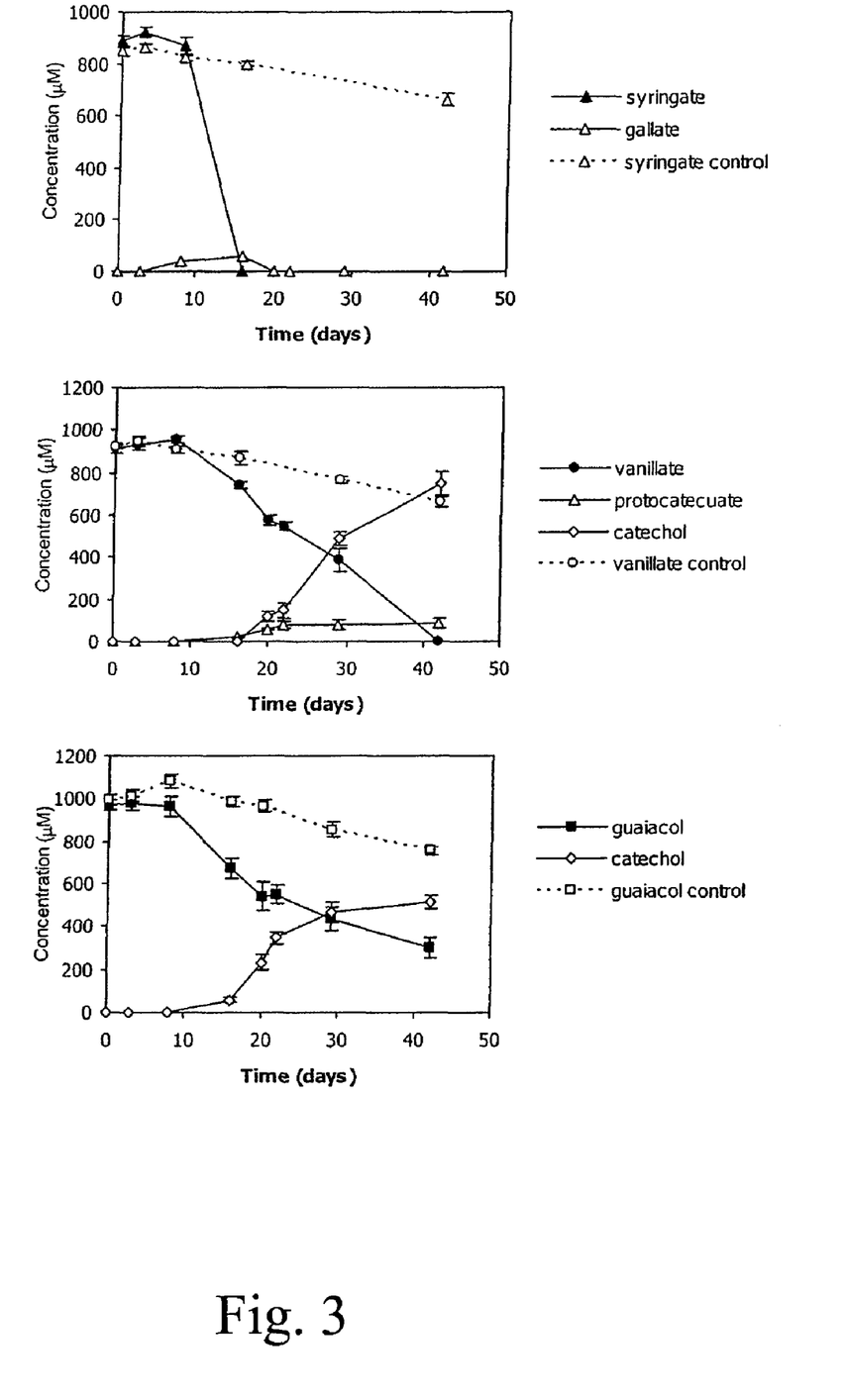
FIG. 3. Anaerobic biodegradation of methoxylated plant phenolic compounds, syringate (a), vanillate (b), and guaiacol (c) and production metabolites by MTBE-utilizing cultures. Error bars represent standard deviation of triplicate cultures.

2. O-Demethylation of Methoxylated Aromatic Compounds by the Methanogenic MTBE-Utilizing Culture Syringate is readily biodegradable by the MTBE-utilizing culture (FIG. 3). Anaerobic degradation occurred after 10 days of incubation. The syringate concentration decreases from 890 mM to below detection limit within 7 days after degradation is first observed. A low concentration of gallate is observed transiently during degradation of syringate. Vanillate degradation starts within 10 days of incubation, but complete substrate loss takes 40 days. Two major metabolites of vanillate are identified as protocatecuate and catechol. Catechol accumulates to a concentration of 735 mM. Anaerobic degradation of guaiacol proceeds at a slower rate compared to that of vanillate. Catechol, the O-demethylation product of guaiacol, is the only intermediate detected and accumulates to a concentration of 520 µM at the end of the experiment. Headspace methane concentrations significantly increase in all live treatments, suggesting the utilization of O-methyl substituents of aromatic compounds. Breakdown of the ring structure of catechol is likely to be a rate limiting-step for vanillate and guaiacol mineralization.

Figure 4A:
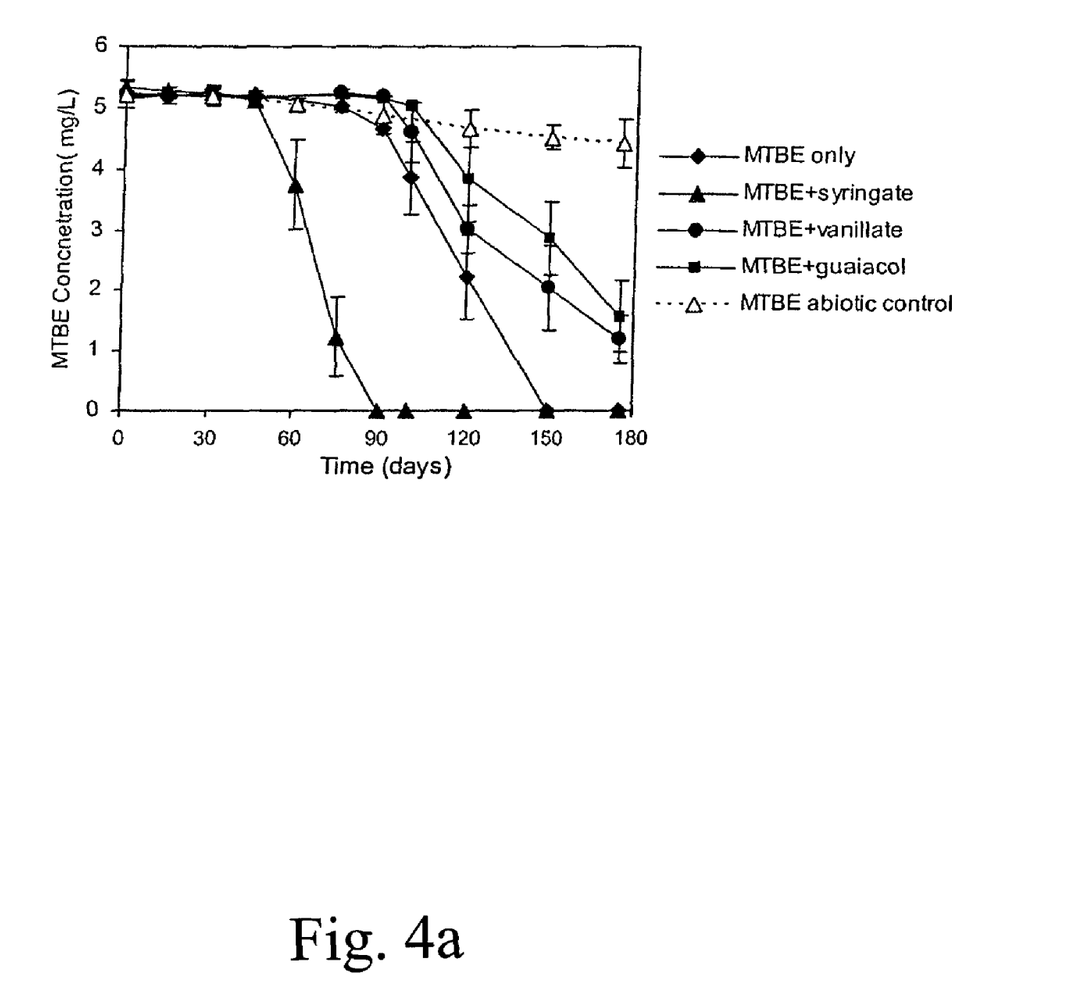

3. Effect of Methoxylated Aromatic Compounds on MTBE Utilization by the MTBE-Utilizing Culture When 80 µM of syringate, vanillate, and guaiacol are added individually as co-substrates of MTBE, both positive and negative substrate interactions are observed. When MTBE is the sole substrate, MTBE utilization is observed after 90 days of incubation and MTBE concentrations decrease to below detection limit within 150 days (FIG. 4a). The addition of syringate enhances the MTBE utilization rate by shortening the lag period to 55 days. The addition of the same concentration of vanillate and guaiacol results in an adverse effect on MTBE degradation, even though the lag periods are comparable to the culture receiving MTBE alone. The retardation by guaiacol is more severe than that of vanillate. In both treatments, MTBE utilization proceeds slowly over time.

Figure 4B:
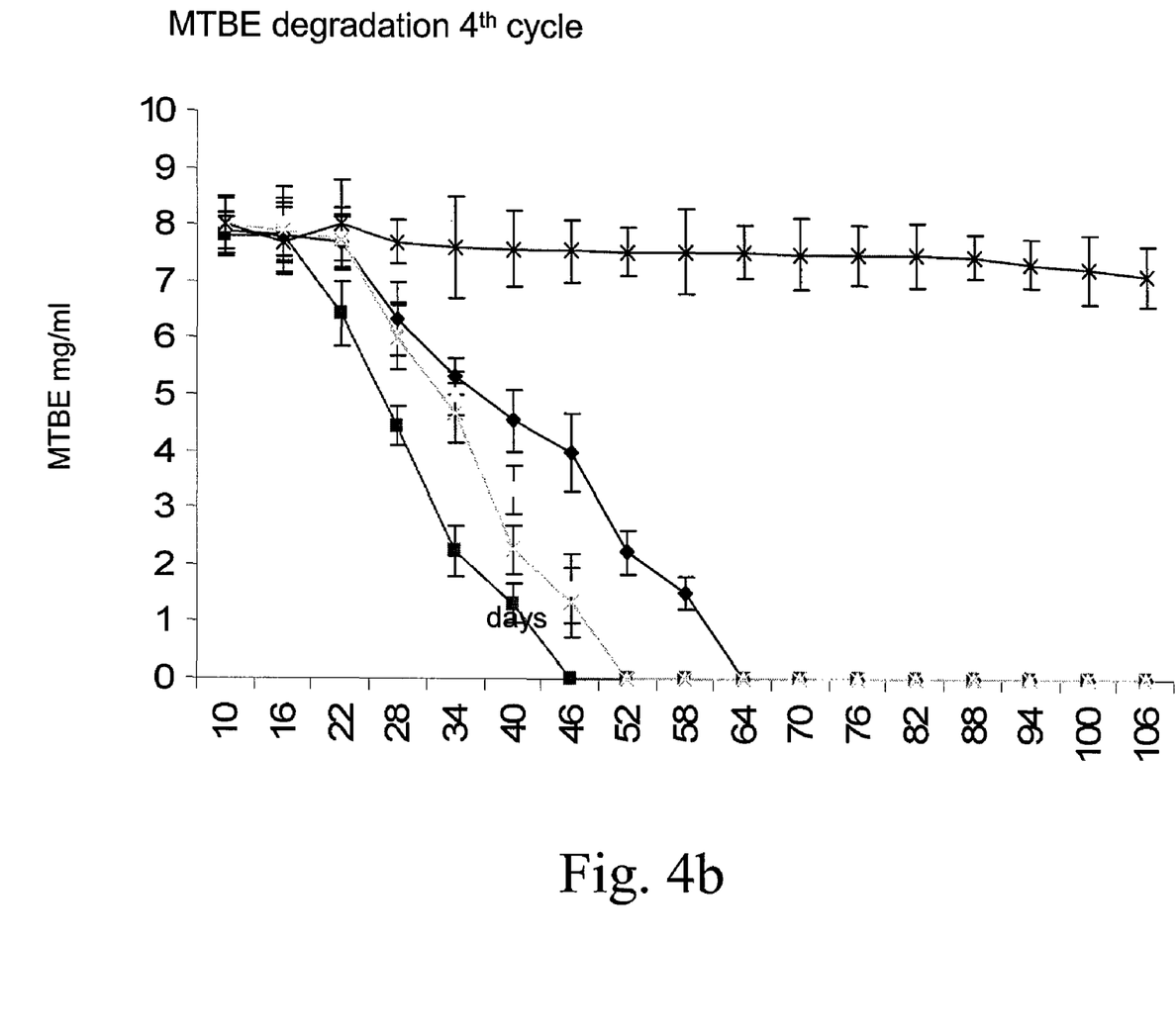

Repeated spiking with MTBE+ an O-methyl aryl ether (syringate, guaiacol, or vanillate; FIG. 4b) led to an increased rate of degradation, whereas on the first spiking, only syringic acid increased the degradation rate and guaiacol and vanillate led to a decrease.

4. MTBE Utilization in the Presence of Various Concentrations of Syringate

Figure 5:
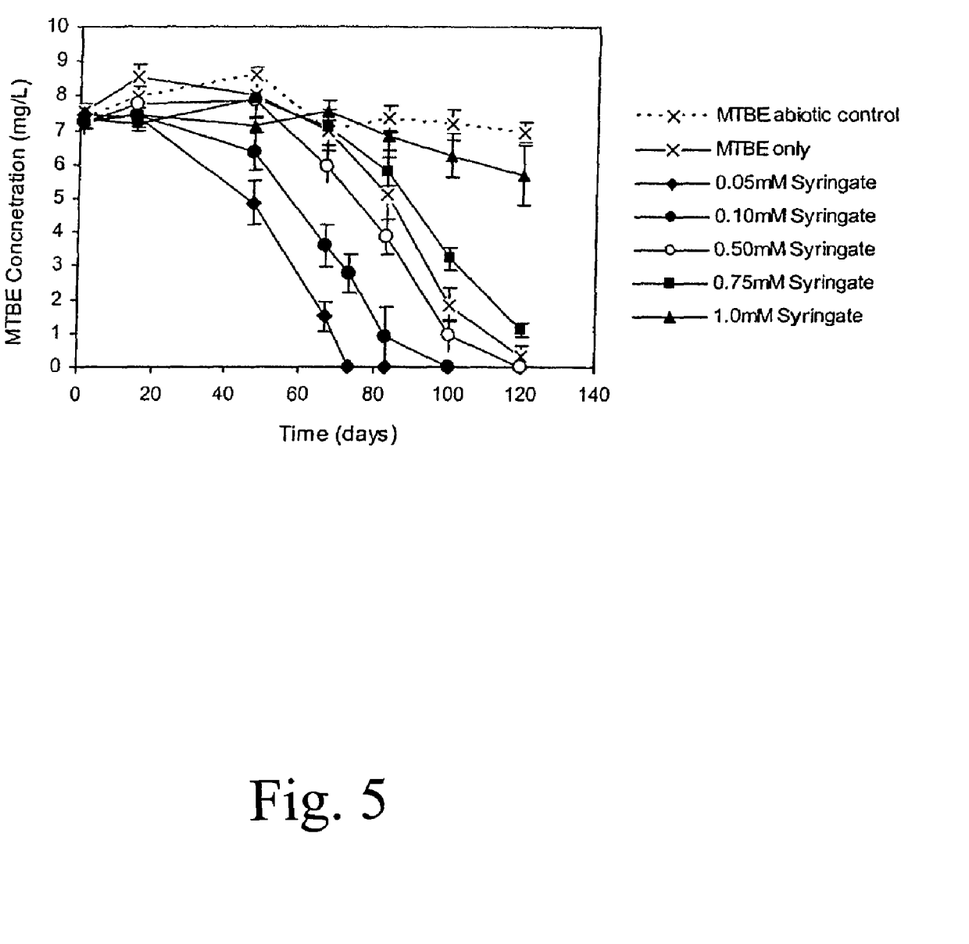
FIG. 5. Effect of various concentrations of syringate on anaerobic biodegradation of MTBE. Error bars represent standard deviation of triplicate cultures.

A follow-up experiment is conducted to examine the effect of various syringate concentrations on MTBE degradation. In this study, syringate concentrations vary from 0 µM to 1000 µM. Without the addition of syringate, MTBE at the initial concentration of 7.5±0.2 mg/L is utilized within 120 days. Syringate at concentrations of 50 µM and 100 µM enhances MTBE utilization. MTBE is utilized in less than 80 days when 50 µM syringate is added as co-substrate. With 500 µM and 750 µM syringate, the MTBE degradation rates are similar to that of MTBE alone. Syringate at 750 µM has a slight inhibitory effect on MTBE utilization, while 500 µM syringate slightly increases MTBE-degrading activity of MTBE-utilizing culture. There is limited MTBE utilization observed over the course of the experiment in the presence of 1000 µM syringate (FIG. 5), though syringate is utilized within 30 days of incubation.

5. Enrichment Cultures

Anaerobic cultures used in this study are enriched from sediment microcosms from two different locations, the Arthur Kill (AK), an intertidal strait between New Jersey and Staten Island, N.Y., and the Coronado Cays (CC), an estuarine site within the vicinity of the San Diego Bay in California. The Arthur Kill enrichment is previously demonstrated to transform MTBE to TBA under sulfate-reducing conditions (Somsamak, P., R. M. Cowan, and M. M. Häggblom. 2001. Anaerobic biotransformation of fuel oxygenates under sulfate-reducing conditions. FEMS Microbiol. Ecol. 37:259-264). The microcosm is originally established using 10% (vol/vol) sediment collected from the Arthur Kill inlet. This sulfate-reducing enrichment has been grown with MTBE as the sole carbon and energy source for >8 years. To an original culture volume of 50 ml, 50 ml sulfate-reducing medium (20 mM sulfate) is added to make a 1:2 dilution. The enrichment is fed twice with 20 mg liter$^{-1}$ MTBE before the enrichment is split into two serum vials to produce second-generation cultures containing 50 ml enrichment slurry. The propagation is repeated once more. At the end, four serum vials, each containing 50 ml MTBE-degrading enrichment slurry, are obtained. To start the experiment for determining carbon isotope fractionation, all four enrichment cultures are combined, supernatant liquid is discarded, and 100 ml fresh sulfate-reducing medium is added. The sediment slurry is then divided evenly into four serum bottles, and fresh sulfate-reducing medium is added to a final volume of 100 ml.

A second set of enrichments are developed from microcosms established using sediment from CC. MTBE-degrading microorganisms are enriched under two different anoxic conditions, sulfate reduction and methanogenesis, following procedures previously described (Somsamak, P., R. M. Cowan, and M. M. Häggblom. 2001. Anaerobic biotransformation of fuel oxygenates under sulfate-reducing conditions. FEMS Microbiol. Ecol. 37:259-264 and Somsamak, P., H. H. Richnow, and M. M. Häggblom. 2005. Carbon isotopic fractionation during anaerobic biotransformation of methyl tert-butyl ether (MTBE) and tert-amyl methyl ether (TAME). Environ. Sci. Technol. 39:103-109). For each enrichment condition, five replicate microcosms are set up, each with 5 g of wet sediment and 5 ml of appropriate medium. To investigate the role of sulfate reduction on carbon isotope fractionation, 20 mM sodium molybdate, a specific inhibitor of sulfate reduction, is added to methanogenic microcosms to suppress sulfate reduction. Two autoclaved controls are prepared for each condition. Live and killed sediments are spiked with MTBE to a final concentration of 20 mg liter$^{-1}$. After >200 days of incubation, complete loss of MTBE is observed in two of the methanogenic microcosms and two of the sulfate-reducing microcosms. TBA is detected in all four microcosms, indicating biological MTBE transformation. Methane is detected in the headspace of methanogenic microcosms, confirming methanogenesis as the terminal electron acceptor of the community when sulfate reduction is inhibited. For the sulfate-reducing conditions, a reduction of 0.20 mM sulfate is calculated for MTBE transformed (only utilization of the methyl group is assumed). This amount of sulfate depletion can not be measured accurately from the large sulfate pool (20 mM). To verify sulfate reduction as the terminal electron-accepting process, 5 mM lactate is added to sediment in a separate experiment. The sulfate concentration decreased stoichiometrically with the amount of lactate utilized. No significant loss of sulfate is observed in the presence of sodium molybdate, indicating inhibition of sulfate reduction. The active microcosms are re-fed with 10 mg liter$^{-1}$ MTBE three more times before fresh medium is added to give a final volume of 100 ml (1:10 dilution). After a lengthy lag period of 75 to 120 days, all active enrichments utilized 20 mg liter$^{-1}$ MTBE within 20 days. The lag period is significantly shorter upon respiking. Before the beginning of the carbon isotope fractionation experiment, the supernatant liquid of all four enrichments is discarded, and fresh medium is replenished to a final volume of 100 ml.

6. Batch Experiments

To examine the carbon isotope fractionation during anaerobic MTBE degradation, eight batch experiments are set up. Four serum bottles, each containing 100 ml of sulfate-reducing AK enrichment, are prepared as described above. Sodium molybdate (20 mM), a specific inhibitor of sulfate reduction, is added to two sulfate-reducing AK cultures. The two remaining cultures are kept under conditions promoting sulfate reduction. From the CC enrichment, two of the 100-ml cultures are prepared for each methanogenic and sulfate-reducing enrichment. Each culture had been enriched individually from separate CC sediment microcosms and had never been combined. Methanogenic and sulfate-reducing media are used as abiotic controls. Anaerobic MTBE stock solution is added to all live enrichments and abiotic controls to a final concentration of 25 to 30 mg liter$^{-1}$. All vials are shaken for 12 h and allowed to settle on the bench top for 30 min, and then liquid sample is taken for analysis of MTBE and TBA concentrations at day 0. For carbon isotope composition analysis, 7-ml samples are taken and added to 15-ml serum vials containing 0.6 g NaCl. The serum vials are pre-capped with gray Teflon-lined butyl rubber septa and crimped with aluminum seals. The samples are adjusted to pH 1 by the addition of 3N HCl. The cultures and abiotic controls are incubated in the dark, unshaken, at 37° C. The headspace MTBE concentrations of the cultures are monitored over time. After approximately 50% of MTBE utilization is observed, liquid samples are taken at selected time points for immediate MTBE and TBA analysis and for later carbon isotope composition analysis. These samples are stored at −20° C. until analysis.

7. Measurement of MTBE Concentration and Isotope Analysis

The concentration of MTBE is determined by a static headspace method. A 100-μl headspace sample is analyzed for MTBE with a Hewlett-Packard 5890 gas chromatograph (GC) equipped with a DB1 column (0.53 mm by 30 m; J&W Scientific, Folsom, Calif.) and a flame ionization detector with He as the carrier gas. The GC column temperature is first held at 35° C. for 3 min, increased to 120° C. at a rate of 5° C. $min^{-1}$, and then held for 1 min. In addition, the concentrations of MTBE and TBA are confirmed by direct injection of 1 μl aqueous sample using the same instrument and temperature program. TBA is identified by comparison of its retention times to an authentic standard. For quantification, external aqueous standards of 3.0, 9.0, 15.0, and 30.0 mg $liter^{-1}$ for each compound are used. Detection limits are 0.5 mg $liter^{-1}$ for MTBE and 1.0 mg $liter^{-1}$ for TBA, respectively.

Stable isotope analyses are conducted at the Stable Isotope Laboratory of the UFZ Centre for Environmental Research, Leipzig-Halle, Germany. The system consisted of a GC (6890 series; Agilent Technology) coupled with a combustion interface (ThermoFinnigan GC-combustion III; ThermoFinnigan, Bremen, Germany) and a Finnigan MAT 252 isotope ratio mass spectrometer (ThermoFinnigan, Bremen, Germany). The organic substances in the CG effluent are oxidized to $CO_2$ on a CuO—Ni—Pt catalyst held at 960° C. A Poraplot Q column (0.32 mm by 25 m; Chrompack, The Netherlands) is used for separation. Helium at a flow rate of 1.5 ml/min is used as carrier gas. The GC temperature program is held at 150° C. for 15 min, increased to 220° C. at a rate of 3° C. $min^{-1}$, and then held for 10 min isothermally. Samples are injected in split mode with a split ratio 1:1 into a hot injector held at 220° C. Headspace injection volumes ranged from 0.2 to 1 ml, based on the concentration of MTBE determined previously. Each sample is analyzed at least in triplicate.

The direct headspace method had a detection limit of approximately 4 mg $liter^{-1}$ for MTBE. The carbon isotopic compositions (R) are reported as notation in parts per thousand (indicated as per mille values) enrichments or depletions relative to the Vienna Pee Dee Belemnite standard of the International Atomic Energy Agency (2). δvalues of carbon are calculated as follows:

$$‰[δ^{-13}C]=(R_{sample}/R_{standard}-1)×1,000$$

where $R_{sample}$ and $R_{standard}$ represent $^{13}C/^{12}C$ ratios of the sample and the Vienna Pee Dee Belemnite standard. The direct headspace analysis of standard MTBE had a mean isotope composition of −30.6‰±0.5‰ (for the results of eight individual measurements).

Figure 6:
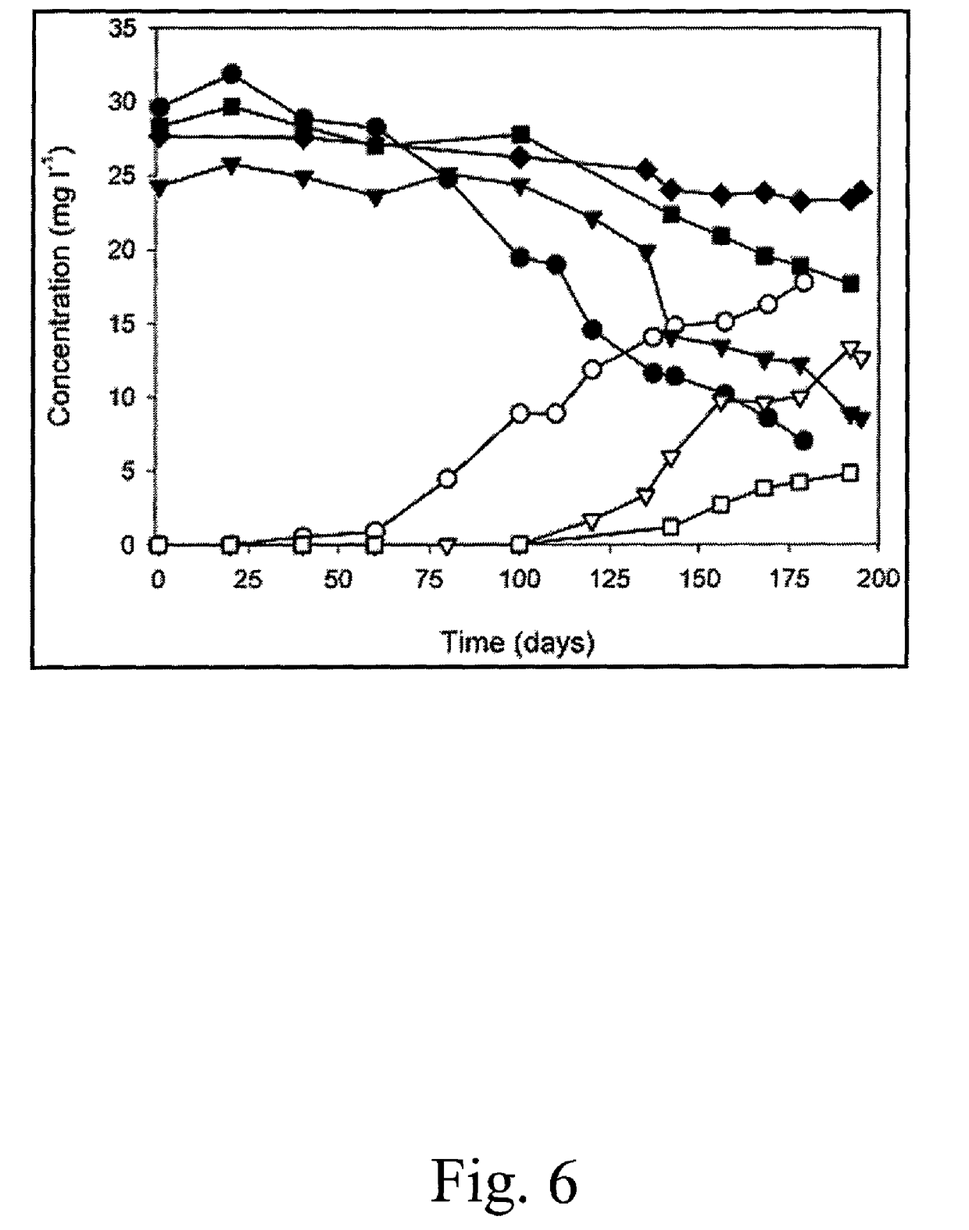
FIG. 6. MTBE (solid symbols) and TBA (open symbols) concentrations during anaerobic MTBE biodegradation by sulfate-reducing Arthur Kill enrichment (replicate 1, circles; replicate 2, triangles), sulfate-reducing Arthur Kill enrichment with molybdate (squares), and abiotic controls (diamonds). The data for enrichment with molybdate and abiotic controls are the average of duplicates.

The anaerobic cultures investigated in this study are enriched from two different estuarine sediments, AK and CC. The sulfate-reducing AK enrichment is maintained with MTBE as the sole carbon source for >8 years. In this study, the sulfate-reducing AK enrichment is used to set up duplicate cultures under conditions promoting either sulfate reduction or depressing sulfate reduction with the specific inhibitor of sulfate reduction, molybdate. MTBE and TBA concentrations in sulfate-reducing and molybdate-inhibited AK cultures and abiotic controls are shown in FIG. 6. In sulfate-reducing cultures, the MTBE concentration gradually decreases over 200 days. From an initial concentration of 29.6 mg $liter^{-1}$ and 24.3 mg $liter^{-1}$, 73% and 68% of MTBE utilization are achieved in replicate 1 and replicate 2 after 179 days and 195 days of incubation, respectively. Stoichiometric amounts of TBA accumulate. In the presence of molybdate, the MTBE utilization rate decreases drastically. TBA is first detected after incubation for >140 days. Therefore, the enrichments incubate with molybdate are excluded from carbon isotope fractionation analysis. At the end of the experiment, 13% of MTBE is lost in abiotic controls, but TBA is not detected.

Figure 7:
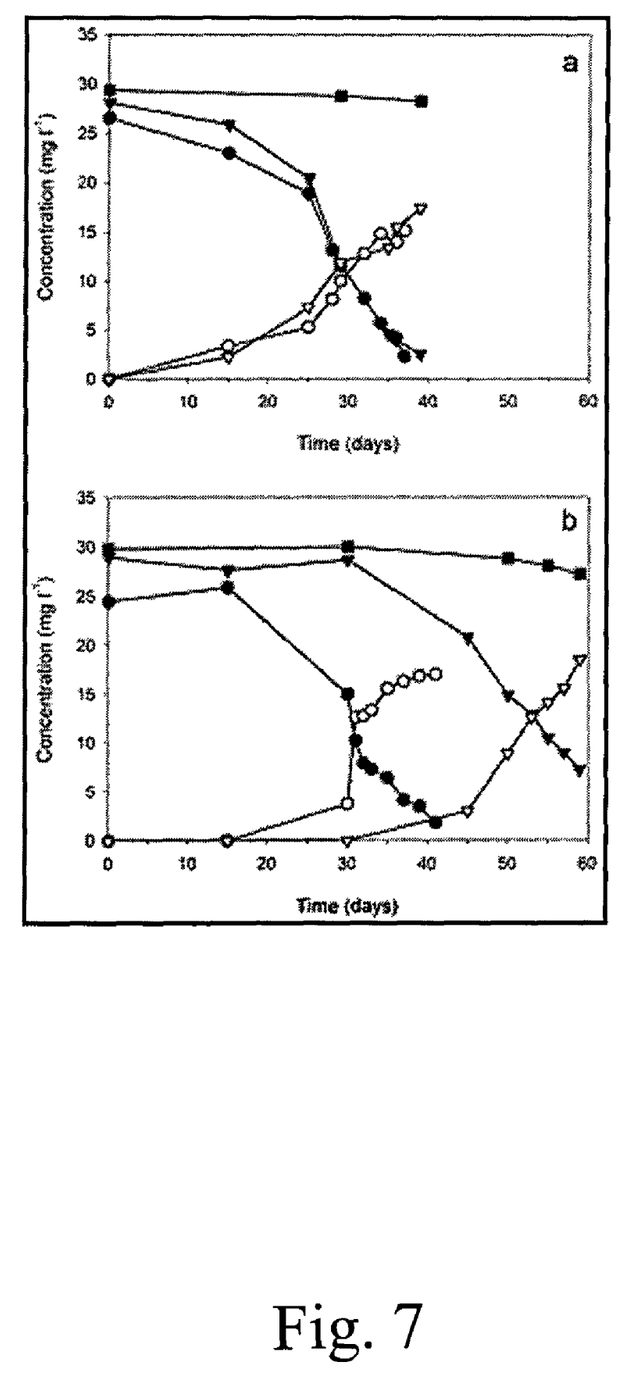
FIG. 7. MTBE (solid symbols) and TBA (open symbols) concentrations during anaerobic MTBE biodegradation by sulfate-reducing (a) and methanogenic (b) Coronado Cay enrichment cultures (enrichment 1, circles; enrichment 2, triangles; abiotic control, squares). The data points of abiotic controls are the averages of duplicate cultures.

Experiments with CC enrichments are conducted with two methanogenic and two sulfate-reducing cultures. All four cultures are enriched individually from different CC microcosms. FIG. 7a shows the MTBE and TBA concentration profiles for the two sulfate-reducing CC enrichments. Initial concentrations of MTBE are 26.6 mg $liter^{-1}$ and 28.1 mg $liter^{-1}$. After a lag period of 15 to 20 days, the enrichments utilize >90% of MTBE fed within 40 days. At the end of the experiment, TBA concentrations account for 74% and 81% of MTBE utilized. One of the two methanogenic CC enrichments utilizes MTBE from an initial concentration of 24.5 mg $liter^{-1}$ to 1.8 mg $liter^{-1}$ within 40 days (FIG. 7b). MTBE degradation in the other methanogenic CC enrichment is observed after 30 days of incubation. From an initial concentration of 28.9 mg $liter^{-1}$, 75% MTBE utilization is achieved within 60 days of incubation. Stoichiometric amounts of TBA (91% and 104%) accumulate. MTBE loss in abiotic controls for both experiments is <10% over 60 days.

Figure 8:
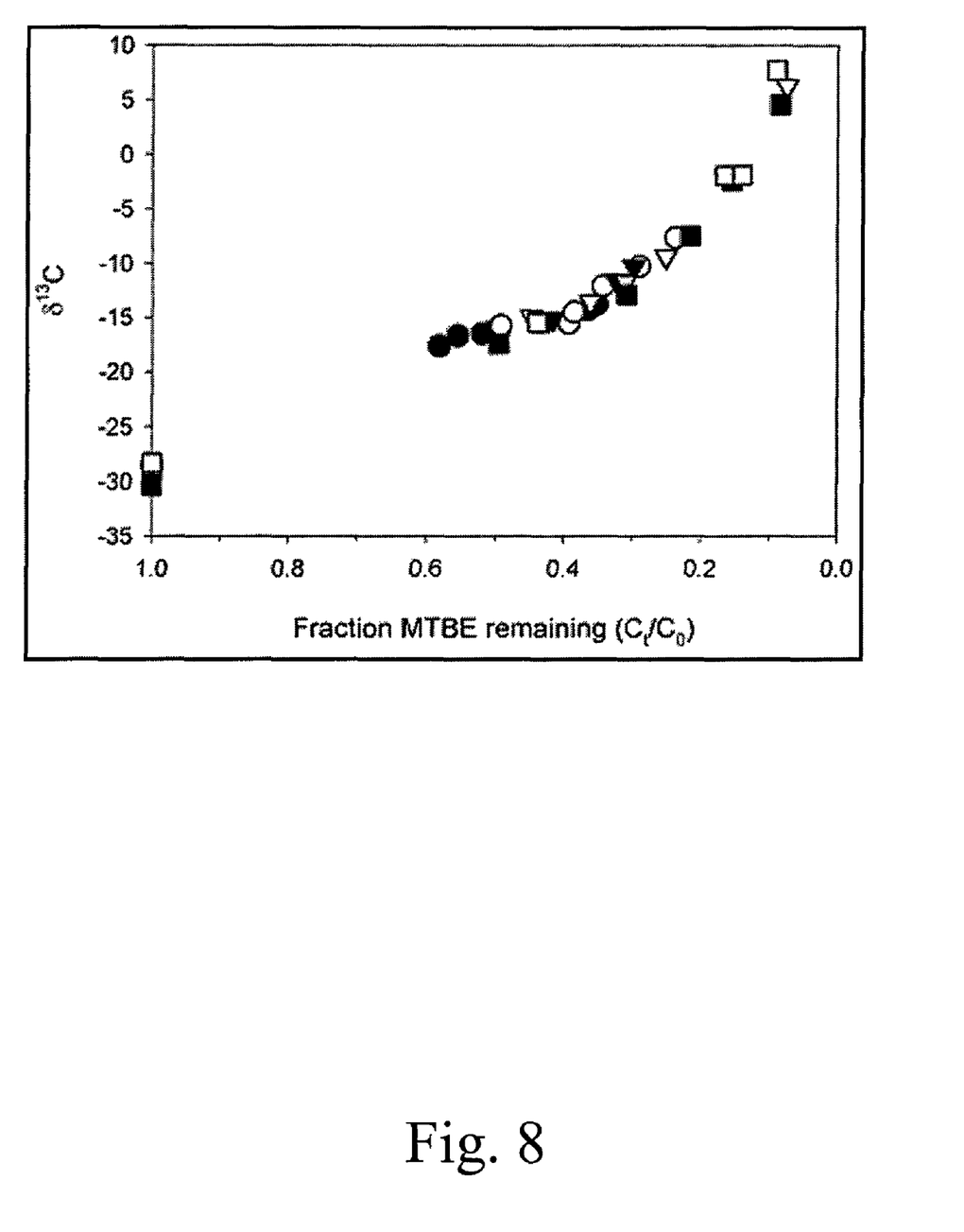
FIG. 8. [$\delta$-$^{13}$C] value of residual MTBE versus the fraction of MTBE remaining in the sulfate-reducing Arthur Kill (circles) and methanogenic (triangles) and sulfate-reducing (squares) CC cultures. Duplicate enrichments are represented by solid and open symbols. The uncertainty of [$\delta$-$^{13}$C] measurement is 0.4‰ (standard deviation, 1$\sigma$).

All live culture samples with MTBE concentrations of >4 mg $liter^{-1}$ are analyzed for carbon isotope composition. The $[δ^{-13}C]$ of MTBE used as reference compound is −30.6‰±0.5‰ and the mean $[δ^{-13}C]$ of all samples (enrichments and abiotic controls) collected on day 0 is −28.6‰±0.2‰ (for 15 samples). The isotopic values of residual MTBE at different stages of MTBE degradation are found to be enriched in $^{13}C$ in all cultures (FIG. 8). A highly similar magnitude of fractionation is observed regardless of the source of enrichment culture or the electron-accepting condition. An enrichment of >12‰ of $δ^{13}C$ values is observed at 50% of MTBE degradation. The enrichment in the residual fraction is >30‰ when >90% of MTBE is degraded. The mean $[δ^{-13}C]$ values of MTBE in abiotic control vials collected on day 40 and day 60 (−28.8‰±0.2‰ and −28.3‰±0.6‰, respectively) are comparable to the mean initial value (−28.6‰±0.2‰). The mean of $[δ^{-13}C]$ of abiotic control sample collected on day 190 (−27.1‰±0.4‰) is slightly less negative. Because the differences in $[δ^{-13}C]$ values of MTBE in abiotic controls at the beginning and the end of the experiment are minimal, the isotope ratios are not analyzed for other abiotic controls collected during the course of experiment.

Figure 9:
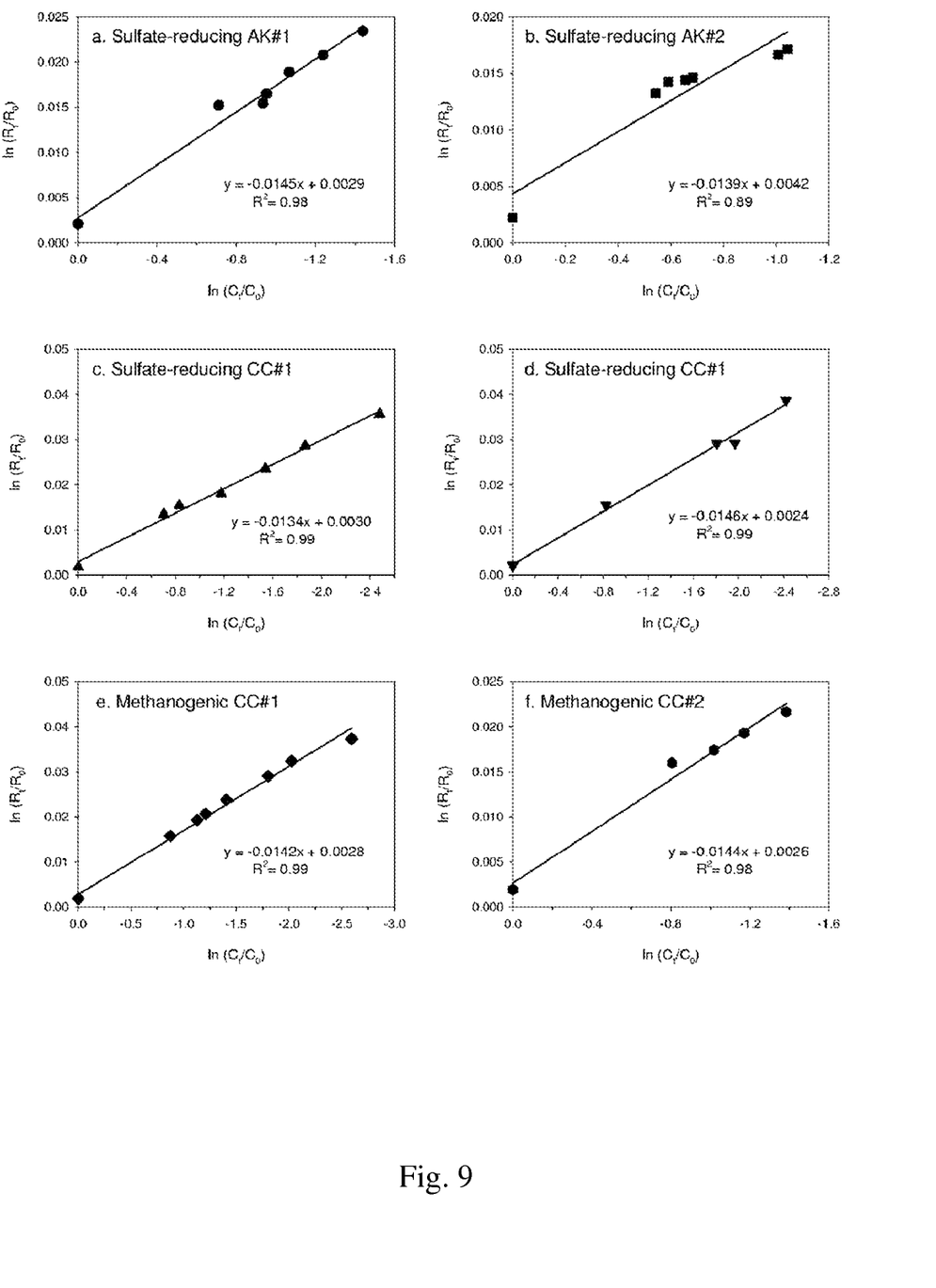
FIG. 9. Double logarithmic plots according to Rayleigh equation of the isotopic composition versus the residual concentration of substrate: sulfate-reducing AK duplicate enrichments (a and b), sulfate-reducing CC enrichments (c and d), and methanogenic CC enrichments (e and f).

Calculation of the isotopic fractionation factor (e) is based on the Rayleigh equation for a closed system (Mariotti, A., J. C. Germon, P. Hubert, P. Kaiser, T. Letolle, A. Tardieux, and P. Tardieux. 1981. Experimental determination of nitrogen kinetic isotope fractionation: some principles; illustration for the denitrification and nitrification processes. Plant Soil 62:413-430 and Rayleigh, J. W. S. 1896. Theoretical considerations respecting the separation of gases by diffusion and similar processes. Philos. Mag. 42:493-498):

$$R_t/R_0=(C_t/C_o)^{(1/α-1)}$$

where R is the isotope ratio, C is the concentration, and the index (0 and t) describes the incubation time at the beginning (0) and during the reaction time of experiment (t). Isotope ratios ($R_t/R_0$) are determined from the equation $R_t/R_0=(\delta_t/1{,}000+1)/(\delta_0/1{,}000+1)$. When ln $R_t/R_0$ versus ln $C_t/C_0$ is plotted, the isotopic enrichment factor ($\epsilon$) could be determined from the slope of the curve (b), with $b=1/\alpha-1$ and $\epsilon=1{,}000\times b$ (FIG. 9). Linear regression is used to estimate the slope of each data set.

The isotopic enrichment factor ($\epsilon$) of each enrichment is listed in Table 1. The $\epsilon$ values varied from $-13.4‰$ to $-14.6‰$. The relatively good correlation between concentration and isotope composition indicated by $r^2$ values of 0.89 to 0.99 suggested that carbon isotope fractionation during anaerobic MTBE degradation can be modeled as a Rayleigh process.

TABLE 1

Isotopic enrichment factors ($\epsilon$) for anaerobic biodegradation of MTBE

| Source | Anaerobic condition(s) | $\epsilon$ (‰) | $R^2$ | n | Source or reference |
|---|---|---|---|---|---|
| Arthur Kill | Sulfate reducing; duplicates | $-14.5 \pm 2.5$ | 0.98 | 7 | This application |
| | | $-13.9 \pm 5.6$ | 0.89 | 7 | |
| Coronado Cays | Sulfate reducing; two enrichments | $-13.7 \pm 1.5$ | 0.99 | 7 | This application |
| | | $-14.4 \pm 3.6$ | 0.99 | 5 | |
| Coronado Cays | Methanogenic; two enrichments | $-14.0 \pm 1.5$ | 0.99 | 8 | This application |
| | | $-14.4 \pm 1.5$ | 0.98 | 6 | |
| Arthur Kill | Methanogenic | $-15.6 \pm 4.1$ | 0.97 | 6 | Somsamak, P., H. H. Richnow, and M. M. Häggblom. 2005. Carbon isotopic fractionation during anaerobic biotransformation of methyl tert-butyl ether (MTBE) and tert-amyl methyl ether (TAME). Environ. Sci. Technol. 39: 103-109 |
| | With inhibitor of methanogenesis | $-14.6 \pm 5.2$ | 0.86 | 9 | Somsamak, P., H. H. Richnow, and M. M. Häggblom. 2005. Carbon isotopic fractionation during anaerobic biotransformation of methyl tert-butyl ether (MTBE) and tert-amyl methyl ether (TAME). Environ. Sci.Technol. 39: 103-109 |
| All data for AK and CC | | $-14.4 \pm 0.7^b$ | 0.97 | 55 | |
| Anaerobic laboratory microcosms | | $-9.16 \pm 5.0$ | 0.728 | | Kolhatkar, R., T. Kuder, P. Philp, J. Allen, and J. T. Wilson. 2002. Use of compound-specific stable carbon isotope analyses to demonstrate anaerobic biodegradation of MTBE in groundwater at a gasoline release site. Environ. Sci. Technol. 36: 5139-5146 |
| Anaerobic field | | $-8.10 \pm 0.9$ | 0.946 | | Kolhatkar, R., T. Kuder, P. Philp, J. Allen, and J. T. Wilson. 2002. Use of compound-specific stable carbon isotope analyses to demonstrate anaerobic biodegradation of MTBE in groundwater at a gasoline release site. Environ. Sci. Technol. 36: 5139-5146 |
| Anaerobic laboratory enrichment[a] | | $-13.0 \pm 1.1$ | | | Kuder, T., J. T. Wilson, P. Kaiser, R. Kolhatkar, P. Philp, and J. Allen. 2005. Enrichment of stable carbon and hydrogen isotopes during anaerobic biodegradation of MTBE: microcosm and field evidence. Environ. Sci. Technol. 39: 213-220 |

[a]The enrichment cultures are derived from microcosms previously reported by Kolhatkar et al. (2002. Use of compound-specific stable carbon isotope analyses to demonstrate anaerobic biodegradation of MTBE in groundwater at a gasoline release site. Environ. Sci. Technol. 36: 5139-5146).

[b]The value represents $\epsilon$ (per mille); n is the number of samples. The standard deviation is given with a confidence interval of ±95%.

We claim:

1. A method for remediating fuel oxygenate-contaminated soil, sediment or groundwater comprising combining a fuel oxygenate-contaminated soil, sediment or groundwater with at least one natural microorganism source capable of converting the fuel oxygenate into an anaerobic bioremediation product and at least one methoxylated phenolic compound selected from the group consisting of syringate, vanillate, and guaiacol under anaerobic conditions for a period of time sufficient to convert at least a portion of the fuel oxygenate into an anaerobic bioremediation product.

2. The method of claim 1 wherein the fuel oxygenate is selected from the group consisting of methyl tert-butyl ether (MTBE), tert amyl methyl ether (TAME), diisopropyl ether (DIPE), ethyl tert-butyl ether (ETBE), and tert-butyl alcohol (TBA).

3. The method of claim 1 wherein the methoxylated phenolic compound is a plant-derived methoxylated phenolic compound.

4. The method of claim 1 wherein the methoxylated phenolic compound is syringate.

5. The method of claim 1 wherein the methoxylated phenolic compound is added at a concentration of about 0.750 mM.

6. The method of claim 5 wherein the methoxylated phenolic compound is added at a concentration of about 0.500 mM.

7. The method of claim 6 wherein the methoxylated phenolic compound is added at a concentration of about 0.100 mM.

8. The method of claim 7 wherein the methoxylated phenolic compound is added at a concentration of about 0.050.

9. The method of claim 1 wherein the anaerobic bioremediation mixture is maintained in a vessel.

10. The method of claim 1 wherein the natural microorganism is present in the fuel oxygenate-contaminated soil.

11. A method for increasing the rate of remediation of fuel oxygenate-contaminated soil comprising maintaining an anaerobic bioremediation mixture comprising fuel oxygenate-contaminated soil, at least one natural microorganism source capable of converting the fuel oxygenate into an anaerobic bioremediation product, and at least one methoxylated phenolic compound selected from the group consisting of syringate, vanillate, and guaiacol under anaerobic conditions for a period of time sufficient to convert at least about 50% of the fuel oxygenate into an anaerobic bioremediation product, wherein the period of time is less than a period of time necessary to convert at least about 50% of the fuel oxygenate into an anaerobic bioremediation product in the absence of the methoxylated phenolic compound.

12. The method of claim 11 wherein the fuel oxygenate is selected from the group consisting of methyl tert-butyl ether (MTBE), tert amyl methyl ether (TAME), diisopropyl ether (DIPE), ethyl tert-butyl ether (ETBE), and tert-butyl alcohol (TBA).

13. The method of claim 11 wherein the methoxylated phenolic compound is a plant-derived methoxylated phenolic compound.

14. The method of claim 11 wherein the methoxylated phenolic compound is syringate.

15. The method of claim 14 wherein the methoxylated phenolic compound is added at a concentration of about 0.750 mM.

16. The method of claim 15 wherein the methoxylated phenolic compound is added at a concentration of about 0.500 mM.

17. The method of claim 16 wherein the methoxylated phenolic compound is added at a concentration of about 0.100 mM.

18. The method of claim 17 wherein the methoxylated phenolic compound is added at a concentration of about 0.050 mM.

19. The method of claim 11 wherein the anaerobic bioremediation mixture is maintained in a vessel.

20. The method of claim 11 wherein the natural microorganism is present in the fuel oxygenate-contaminated soil.

* * * * *